United States Patent
Maroy et al.

(10) Patent No.: US 9,092,867 B2
(45) Date of Patent: Jul. 28, 2015

(54) METHODS FOR SEGMENTING IMAGES AND DETECTING SPECIFIC STRUCTURES

(75) Inventors: Renaud Maroy, Paris (FR); Regine Trebossen, Paris (FR); Paolo Zanotti Fregonara, Bethesda, MD (US)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 136 days.

(21) Appl. No.: 13/201,850

(22) PCT Filed: Feb. 10, 2010

(86) PCT No.: PCT/FR2010/050218
§ 371 (c)(1),
(2), (4) Date: Nov. 30, 2011

(87) PCT Pub. No.: WO2010/097534
PCT Pub. Date: Sep. 2, 2010

(65) Prior Publication Data
US 2012/0070052 A1 Mar. 22, 2012

(30) Foreign Application Priority Data
Feb. 27, 2009 (FR) ...................................... 09 51289

(51) Int. Cl.
*G06K 9/00* (2006.01)
*G06T 7/00* (2006.01)

(52) U.S. Cl.
CPC ............. *G06T 7/0081* (2013.01); *G06T 7/0089* (2013.01); *G06T 2207/10076* (2013.01); *G06T 2207/10104* (2013.01); *G06T 2207/20016* (2013.01); *G06T 2207/30096* (2013.01)

(58) Field of Classification Search
None
See application file for complete search history.

(56) References Cited

U.S. PATENT DOCUMENTS 4,525,858 A * 6/1985 Cline et al. ..................... 382/154
5,768,413 A * 6/1998 Levin et al. .................... 382/173
(Continued)

FOREIGN PATENT DOCUMENTS

WO     WO2008001694    *   3/2008 ............... A61B 5/00

OTHER PUBLICATIONS

Paolo Zanotti-Fregonara, Renaud Maroy, Claude Comtat, Sebastien Jan, Veronique Gaura, Avner Bar-Hen, Maria-Joao Ribeiro, and Regine Trebossen; "Comparison of 3 Methods of Automated Internal Carotid Segmentation in Human Brain PET Studies: Application to the Estimation of Arterial Input Function" Feb. 17, 2009, Published by the Society of Nuclear M.*

(Continued)

*Primary Examiner* — Jon Chang
*Assistant Examiner* — Oneal R Mistry
(74) *Attorney, Agent, or Firm* — Knobbe Martens Olson & Bear LLP

(57) ABSTRACT

It relates to a method for segmenting images, to a method for detecting specific structures, and to a related computer device. The method for segmenting a three-dimensional image of a subject includes dividing the image into a plurality of regions, and then hierarchically merging the regions resulting from the division in order to obtain a three-dimensional image partitioned into regions of interest. The hierarchical merging includes a merging step using shape and size criteria of the regions so as to avoid merging small regions. The method for detecting specific structures in an image, for example tumors, includes a step of segmenting an image into regions of interest. The method further includes calculating, for each region of interest, a plurality of criteria, including a shape criterion, of the regions of interest in order to discriminate the specific structures to be detected from the regions of interest of the segmented image.

26 Claims, 4 Drawing Sheets

(56) References Cited

U.S. PATENT DOCUMENTS

| | | | |
|---|---|---|---|
| 5,859,891 A * | 1/1999 | Hibbard | 378/62 |
| 6,122,042 A * | 9/2000 | Wunderman et al. | 356/73 |
| 6,249,594 B1 * | 6/2001 | Hibbard | 382/128 |
| 6,307,914 B1 * | 10/2001 | Kunieda et al. | 378/65 |
| 6,373,918 B1 * | 4/2002 | Wiemker et al. | 378/62 |
| 7,092,548 B2 * | 8/2006 | Laumeyer et al. | 382/104 |
| 7,251,374 B2 * | 7/2007 | Niemeyer | 382/240 |
| 7,382,907 B2 * | 6/2008 | Luo et al. | 382/128 |
| 7,558,611 B2 * | 7/2009 | Arnold et al. | 600/407 |
| 7,941,462 B2 * | 5/2011 | Akinyemi et al. | 707/803 |
| 8,126,231 B2 * | 2/2012 | Sakaida | 382/128 |
| 8,331,641 B2 * | 12/2012 | Valadez et al. | 382/131 |
| 8,346,483 B2 * | 1/2013 | Kil | 702/19 |
| 2010/0128950 A1 * | 5/2010 | Woods et al. | 382/131 |
| 2010/0272341 A1 * | 10/2010 | Reeves et al. | 382/131 |

OTHER PUBLICATIONS

Hong Guo, Rosemary Renaut, Kewei Chen, Eric Reiman, "Clustering huge data sets from parametric PET imaging"; 2003, Elsevier Ireland Ltd., DOI—10.1016/S0303-264(03)00112-6.*

Ronald Boellaard, PhD; Nanda C. Krak, MD; Otto S. Hoekstra, PhD; and Adriaan A. Lammertsma, PhD, "Effects of Noise, Image Resolution, and ROI Definition on the Accuracy of Standard Uptake Values: A Simulation Study",Nov. 24, 2003.*

Michaelann S. Tartis 1, Dustin E. Kruse, Hairong Zheng, Hua Zhang, Azadeh Kheirolomoom, Jan Marik, Katherine W. Ferrara, "Dynamic microPET imaging of ultrasound contrast agents and lipid delivery", May 6, 2008.*

Paolo Zanotti-Fregonara, Renaud Maroy, Claude Comtat, Sebastient Jan, Veronique Gaura, Avner Bar-Hen, Maria-Joao Ribeiro, and Regine Trebossen; "Comparison of 3 Methods of Automated Internal Carotid Segmentation in Human Brain PET Studies: Application to the Estimation of Arterial Input Function" Feb. 17, 2009.*

Hong Guo, Rosemary Renaut, Kewei Chen, Eric Reiman, "Clustering huge data sets from parametric PET imaging"; 2003, Elsevier Ireland Ltd.*

Cates, et al., "Case Study: An Evaluation of User-Assisted Hierarchical Watershed Segmentation", Medical Image Analysis, Oxford University Press, Oxford, GB, vol. 9, No. 6, Dec. 1, 2005, pp. 566-578.

Maroy, et al., "Segmentation of Rodent Whole-Body Dynamic PET Images: An Unsupervised method Based on Voxel Dynamics", IEEE Transactions o Medical Imaging, IEEE Service Center, Piscataway, NJ, US, vol. 27, No. 3, Mar. 1, 2008, pp. 342-354.

Feng, et al., "Graph-Based Mumford-Shah Segmentation of Dynamic PET with Application to Input Function Estimation", IEEE Transactions on Nuclear Science, IEEE Service Center, NY, US, vol. 52, No. 1, Feb. 2, 2005, pp. 79-89.

International Search Report and Written Opinion issued in PCT/FR2010/050218.

* cited by examiner

METHODS FOR SEGMENTING IMAGES AND DETECTING SPECIFIC STRUCTURES

RELATED APPLICATIONS

This application is a U.S. National Phase of International Application No.: PCT/FR2010/050218, filed Feb. 10, 2010, designating the U.S., and published in French as WO 2010/097534 on Sep. 2, 2010 which claims the benefit of French Patent Application No. 09 51289 filed Feb. 27, 2009.

FIELD OF THE INVENTION

The present invention relates to a method for segmenting images, a method for detecting particular structures, and a related computer device.

BACKGROUND OF THE INVENTION

The invention applies to the field of medical imaging, and more particularly the field of positron emission tomography (PET).

Today, physicians use medical imaging to establish a diagnosis, in oncology, for example, or as therapeutic treatment in radiotherapy. The imaging devices, for example X scanner (CT for Computed Tomography), magnetic resonance (MRI) or PET, produce images supplying anatomical or functional information. The images undergo image processing algorithms so as to help the physician in establishing his diagnosis. One image processing consists of a segmentation operation aiming to group together pixels of the image according to predefined criteria. The pixels are thus grouped together in regions that constitute a partition of the image, for example to visualize the organs or particular structures such as tumors.

Document FR-0505441 describes a method for segmenting a three-dimensional image or sequence of images comprising, in the performance order of the method, the following steps:
dividing the image or sequence of images into a plurality of regions; then
hierarchically linking the regions resulting from the division so as to obtain the image or sequence of three-dimensional images partitioned into regions of interest.

However, this segmentation method is not effective enough to segment small structures such as tumors. In fact, the radioactive concentration of the tracer is underestimated inside these small structures. This effect is commonly called the partial volume effect and is the consequence of the limited spatial resolution and the chosen sampling.

SUMMARY OF THE INVENTION

The aim of the invention is to provide a tool and a method for automatically drawing tumors making it possible to effectively distinguish the tumoral zones, even small ones, from healthy zones. The invention will facilitate image processing by a nuclear physician or radiotherapist and thereby improve his diagnostic effectiveness and/or train him, if he is a beginner, in simulated or real data. The invention is not limited to diagnosis in humans, but can also apply to animals.

To that end, the invention relates to a method for segmenting an image or sequence of three-dimensional images of the aforementioned type, characterized in that the hierarchical linkage step comprises a linkage step using shape and size criteria for regions so as not to link small regions.

According to particular embodiments, the method for segmenting an image or sequence of three-dimensional images includes one or more of the following features:
the hierarchical linkage step also comprises a linkage step of the regions without shape and size criteria for the regions intended to link the regions into regions of interest, without distinguishing by shape or size;
the step for linking the regions without shape and size of the regions is done after the linkage step using shape and size criteria of the regions and from the image or sequence of images resulting from the performance of this linkage step;
the hierarchical linkage step is a double linkage also comprising a linkage step without shape and size criteria for the regions from the image or sequence of images divided into regions resulting from the performance of the division step;
the or each linkage step for the regions without shape and size criteria of the regions comprises a step for calculating a linkage cost, between a region $R_1$ and a region $R_2$, defined by:

$$Cost(R_1, R_2) = H(R_1, R_2)$$

H being a function depending on variations of the signal in regions $R_1$ and $R_2$; then a linkage step for the images according to a minimum linkage cost rule;
the linkage step using shape and size criteria for the regions so as not to link the small regions comprises a step for calculating a linkage cost, between a region $R_1$ and a region $R_2$, defined by:

$$Cost(R_1, R_2) = \frac{H(R_1, R_2)}{F(R_1)F(R_2)G(R_1)G(R_2)}$$

H being the function depending on the variations of the signal in regions $R_1$ and $R_2$, F and G being functions respectively dependent on the shape and size of the region; then a step for linkage of the images according to a minimum linkage cost rule;
the image or sequence of images comprises a plurality of voxels and measurements for each of the voxels of a variable of the image or sequence of images, during n time intervals ($n \geq 1$) and the segmentation method comprises, before the step for division into regions, the following steps intended to define the number of regions separated during the division step:
a calculation of a local spatial variance map of said measured variable of the image or sequence of images, over time and for each voxel of the image or sequence of images; then
an automatic extraction of at least one core point of the image or sequence of images, the core points being the pixels of the minima of the local spatial variance map of said variable; the number of core points extracted during this step defining the number of regions of the image or sequence of images divided at the end of the division step;
the method comprises, after the step for automatic extraction of the core points and before the division step, a step for extracting a temporal evolution of said variable of the or each core point and an estimation of the global parameters of the noise, intended to calculate the linkage cost during the hierarchical linkage step;
each region resulting from the step for division of the image or sequence of images corresponds to a core point resulting from the step for automatic extraction of the core points of the image or sequence of images and each region groups together the pixels having a similar temporal evaluation of said variable.

the method comprises a step for excluding a background of the image or sequence of images comprising a step for defining a threshold for the image or sequence of images intended to extract a mask of the object from an image acquired in transmission of the object so as to apply the segmentation method only to the object;

the exclusion step of the background comprises a smoothing step to maximize a contrast of the image in the small regions of interest before the step for defining a threshold;

said image or sequence of images is acquired beforehand by an imaging device according to the positron emission tomography technique;

the image or sequence of images of an object is an image or sequence of images of an entire body, said segmentation method segmenting the body according to a partition into pharmaco-organs;

the body is animated by physiological movements either of the periodic type, the period of which is reduced in comparison with the acquisition duration of the image or each of the images of the sequence, or the non-periodic type; and said variable represents the radioactive concentration at a given moment of at least one active ingredient marked and injected into the body, the set of voxels inside each pharmaco-organ having pharmacological kinetics for distribution of said active ingredient that are similar.

The invention also relates to a method for detecting at least one particular structure over an image or sequence of images, characterized in that it comprises the following steps:

segmentation of the image or sequence of images intended to segment it into a plurality of regions of interest; the segmentation of the image or sequence of images being the result of the performance of a method for segmenting an image or sequence of three-dimensional images of an object as described above;

calculating a plurality of criteria to discriminate the particular structures to be detected for each region of interest;

calculating an identification function depending on the plurality of criteria for each region of interest, the identification function being a parametric function depending on a set of parameters;

and the plurality of criteria comprises a shape criterion for the regions of interest so as to discriminate the particular structures among the regions of interest.

According to specific embodiments, the method for detecting at least one tumor on an image or sequence of images segmented into a plurality of regions of interest includes one or more of the following features:

segmenting the image or sequence of images into a plurality of regions of interest is the result of the performance of a method for segmenting an image or sequence of three-dimensional images of an object having a linkage step without shape and size criteria for the regions after a linkage step with shape and size criteria as described above.

the method comprises a step for classifying regions of interest according to a probability of being a particular structure to be detected from the calculation of the identification function.

The invention also relates to a computer device for segmenting an image or a sequence of three-dimensional images of an object acquired by an imaging device comprising:

a means for dividing the image or sequence of images into a plurality of regions;

a means for hierarchical linkage of the regions resulting from the division so as to obtain the three-dimensional image or sequence of images partitioned into regions of interest;

characterized in that the hierarchical linkage means comprises a linkage means using shape and size criteria for the regions so as not to link the small regions.

The invention relates to a computer device for detecting at least one particular structure on an image or sequence of images, characterized in that it comprises:

a device for segmenting the image or sequence of images as described above intended to segment it into a plurality of regions of interest;

a detection means comprising:

a means for calculating a plurality of criteria to discriminate the particular structures to be detected for each region of interest; the plurality of criteria comprising a shape criteria for the regions of interest so as to discriminate the particular structures among the regions of interest;

a means for calculating an identification function depending on the plurality of criteria for each region of interest, the identification function being a parametric function depending on a set of parameters.

According to specific embodiments, the computer device for processing an image or sequence of three-dimensional images of an object acquired by an imaging device includes one or more of the following features:

the device includes:

a means for automatic adaptation of a color palette for a region of interest of the image or sequence of images designated by an operator; the means for automatic adaptation of a color palette being intended to help the operator establish a diagnosis; and a man-machine interface comprising a display means intended to display information generated by the automatic adaptation means of the color palette;

the man-machine interface comprises a display means for displaying structures detected and classified by the detection means;

the device comprises a quantification means for diagnostic parameters in a structure designated by the operator, and a comparison means for comparing the diagnostic parameters between at least two images; and the man-machine interface comprises a display means for displaying diagnostic parameters and a result of the comparison done by the comparison means.

BRIEF DESCRIPTION OF THE DRAWINGS

The invention will be better understood upon reading the following description, provided solely as an example, and done in reference to the appended drawings, in which.

DETAILED DESCRIPTION OF THE EMBODIMENTS

This invention applies to all types of images, for example medical or more specifically oncology-related.

Figure 1:
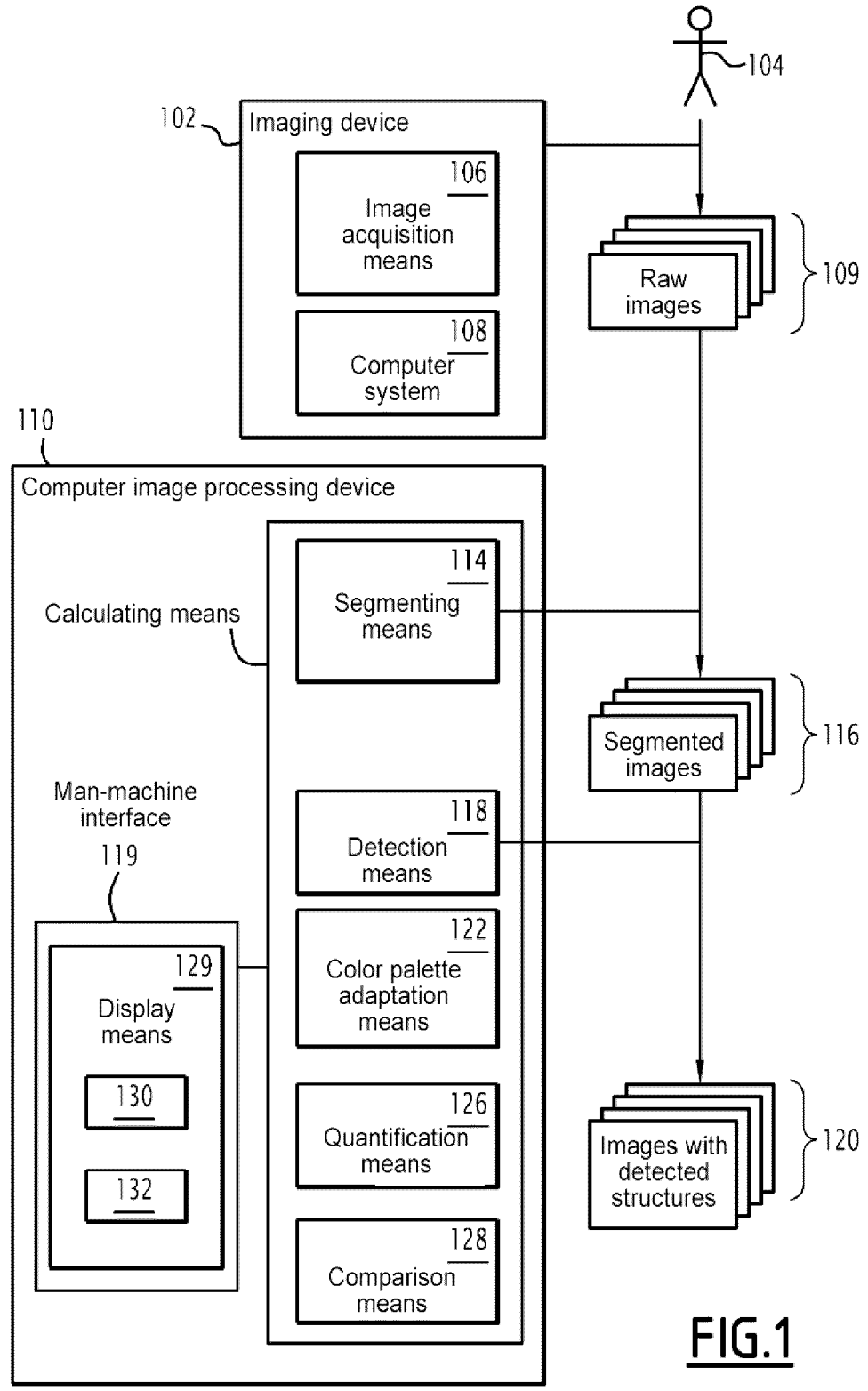
FIG. 1 is a diagrammatic view of an image acquisition and processing installation according to the invention.

FIG. 1 shows an image acquisition and processing installation.

This installation allows a physician to establish a diagnosis for a patient from an image or series of medical images for the subject.

This medical image or sequence of images results from the use of an imaging device 102 on an object or subject 104. This imaging device 102 comprises acquisition means 106 and a computer system 108. This computer system 108 is intended to steer the acquisition means 106 and to reconstitute the images using a reconstruction algorithm.

The imaging device 102 is, for example, an X-ray scanner, a magnetic resonance imaging (MRI) system or a positron emission imaging (PET) system.

In the case of PET imaging, the algorithms reconstruct, for all or part of the subject's body 104, the distribution of a radioactive tracer in the form of a two- or three-dimensional image. The images thus obtained are called "raw" 109 because they have not undergone any processing aside from their reconstruction by the image reconstruction algorithm.

Then, to facilitate the physician's diagnosis, the "raw" images 109 are processed by different algorithms integrated into a computer device 110 intended for example to segment the image or sequence of images 109, or to detect particular structures in the image, such as tumors.

To that end, the computer device 110 comprises a means 114 for segmenting an image, performing, via a processor, a segmenting method, according to the inventive method that will be described below, intended to partition the raw image or sequence of images 102 into a plurality of regions of interest, for example for the organs, forming a segmented image or sequence of images 116.

Moreover, the computer device 110 has a detection means 118 for detecting at least one particular structure, for example a tumor, on a segmented image or sequence of images 116. This detection means performs, via the processor, a detection method according to the invention, which will be described later.

The image or sequence of images, processed beforehand by the segmenting means 114, is then analyzed by the detection means 118, which detects the particular structures such as tumors in the segmented image or sequence of images 116. The result of this analysis forms a so-called "analyzed" image or sequence of images 120, which shows the particular structures detected.

In order to visualize the raw image or sequence of images 109, segmented 116 or analyzed 120, a man-machine interface 119, having a display means, for example a screen, is integrated into the computer device 110.

Furthermore, for the operator to be able to interact with the computer device 110, its man-machine interface 119 has an information input means relative to the processing of an image or sequence of images 109 or 116, intended to enter information to perform the processing of the image or sequence of images. The input means is for example a keyboard and/or a movement device for a virtual cursor visualized on the display means.

Lastly, after having performed the processing on the image or sequence of images, the operator can display the segmented or "analyzed" image or sequence of images 116 using the man-machine interface display means 119. In addition to the visualization of the PET image in the three cardinal directions (axial-sagittal-coronal), the computer device 110 helps the doctor improve the efficacy and rapidity of his diagnosis comprising means 122 for automatically adapting a color palette, quantifying 126 diagnostic parameters and a means 128 for comparing these parameters between two images 120, and a display means 130, 132, incorporated into the man-machine interface 119, information created by these means 122, 126 and 128, the operation of which is described below.

Generally, the choice of a color palette for the image takes time from the nuclear physician, and a poor palette risks causing tumors to be missed. On a PET image, the color palette is formed by a plurality of colors, for example from white to black, respectively corresponding to minimum $P_{min}$ and maximum $P_{max}$ levels of the palette and associated with the minimum value $I_{min}$ and maximum value $I_{max}$ of the image's intensity. Each color corresponds to a range of values of the intensity of the pixels of the image or sequence of images.

In order for the physician to perform the analysis himself or verify the analysis using the detection means 118 of an image concerning a particular structure, for example a tumor, the physician selects the structure, for example by clicking on it using a virtual pointer, then validates by actuating a button. The automatic adaptation means 122 of the color palette then calculates the maximum value $R_{max}$ of the variable measured in the PET image within the region of interest in a given radius and the minimum value $R_{min}$ of the variable measured outside the region in a given radius, for example 5 mm, around said region. The minimum level $P_{min}$, maximum level $P_{max}$ respectively, of the color palette is then reassigned the minimum value $R_{min}$, maximum value $R_{max}$ respectively, of the variable previously calculated in the region of interest. The colors between the black and white are recalibrated regularly between the maximum and minimum values.

This automatic adaptation means 122 of the color palette of the image is extremely useful for the nuclear physician: it accelerates and improves the detection task, and consequently the establishment of a diagnosis.

The detection means 118 uses a detection method, according to the invention. It will be described hereinafter. By carrying out this method, regions of interests, called candidates, are detected, and a classification is established according to their probability of being particular structures, such as tumors.

The display means of the detected structures 130 allows the operator to see all of the candidates, i.e. the regions of interest that seem to be a tumor, for example, between a rank $N_{min}$ and rank $N_{max}$ of the classification established by the detection means 118. The candidates are for example identified by arrows or by a color spot in the image. A code, for example a color code, is intended to immediately visualize their rank in the classification.

After having identified the particular structures, such as tumors, a quantification means 126 calculates quantitative diagnostic parameters known and used by the physicians to more precisely analyze the particular structures, for example to perform medical follow-up. The diagnostic parameters are, for example: the mean or maximum SUV (Standard Uptake Value), the volume of the region, or the total amount of activity in the region.

Furthermore, in the context of medical follow-up during treatment, for example, a comparison means 128 makes it possible to compare the values of the diagnostic parameters calculated by the quantification means 126 on two different images.

These parameters and the result of the comparison are visualized by the physician on the information display means 132.

According to one embodiment, the computer system 108 of the imaging device 106 includes the image processing device 100.

Figure 2:
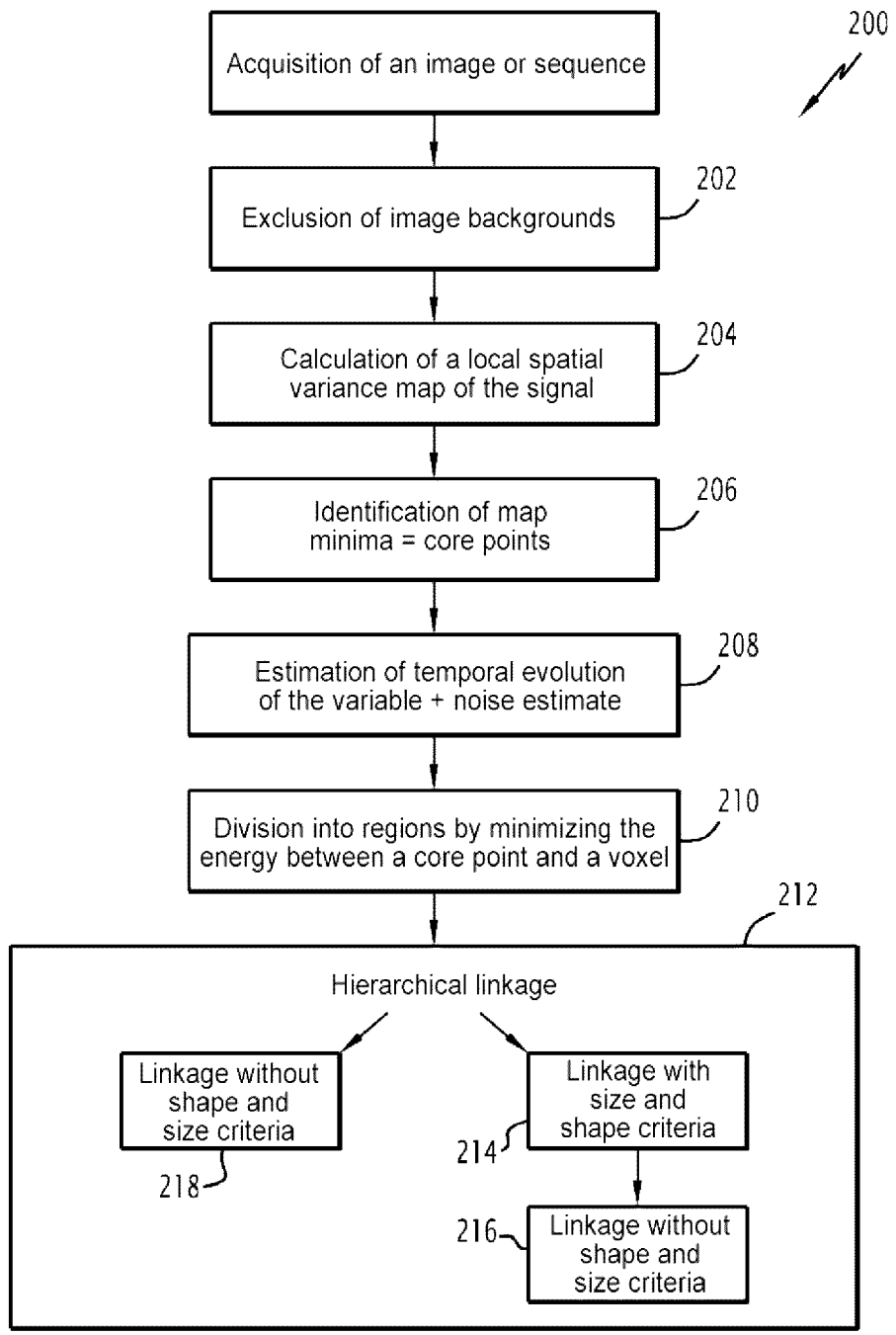
FIG. 2 is a block diagram illustrating the method for segmenting an image or sequence of three-dimensional images according to the invention.

FIG. 2 shows a segmentation method 200 for segmenting a three-dimensional image or sequence of images 109 of a subject 104, so as to obtain a three-dimensional image or sequence of images partitioned into regions of interest 116.

The image or sequence of images 109 acquired by the imaging device 102 comprises a plurality of voxels and measurements for each of the voxels of a variable of the image or sequence of images 109, during n time intervals (n≥1).

Figure 3:
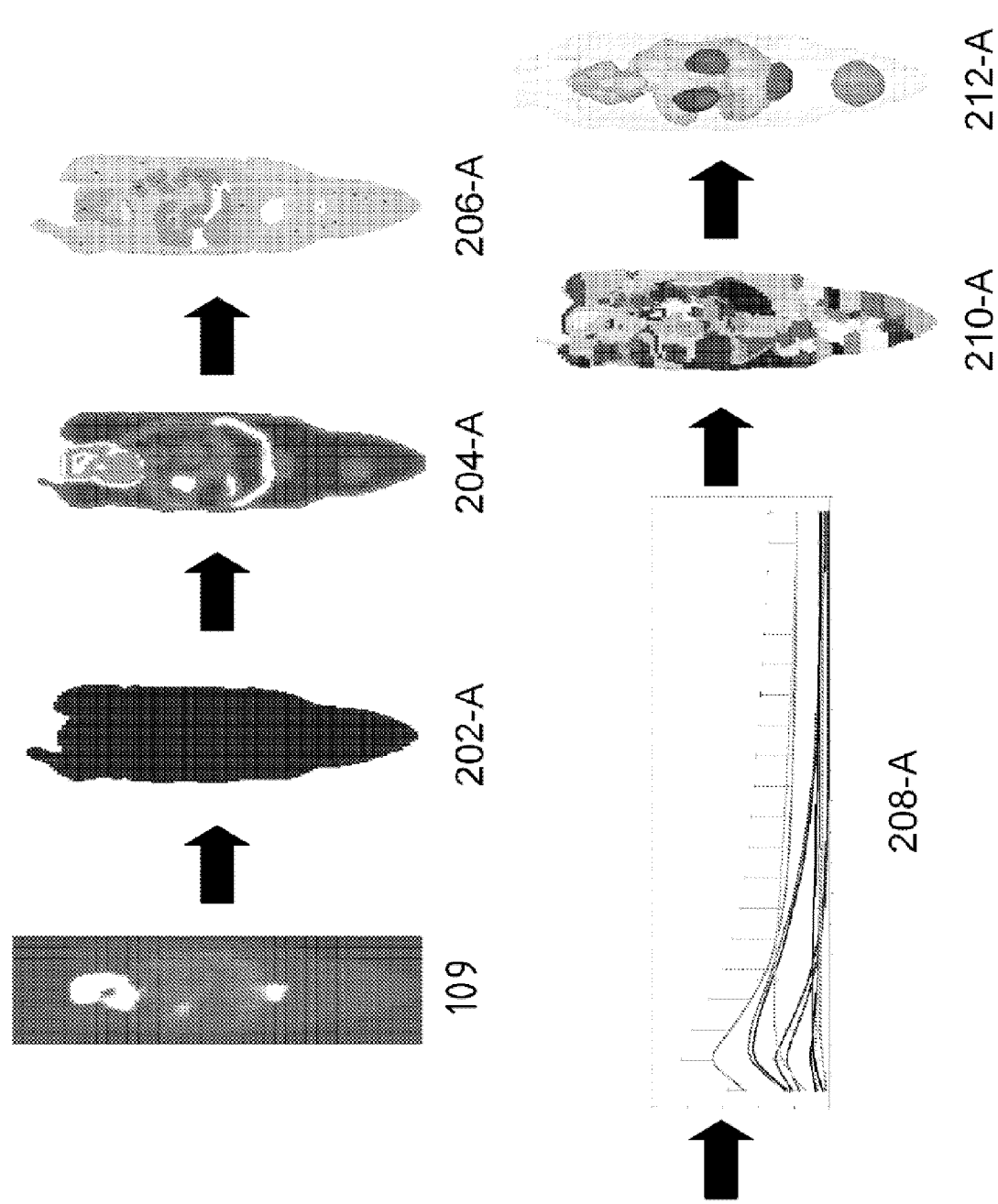
FIG. 3 is an illustration of successive images obtained during the performance of the segmentation method of an image or sequence of three-dimensional images of a rodent according to the invention.

FIG. 3 is an illustration of the successive images obtained during the performance of this segmentation method 200 on an image of a rodent obtained by the PET imaging technique. In the case of this technique, said measured variable is the concentration of the tracer. When the measurement is done as a function of time, this variable is called pharmacokinetic and the regions of interest are called pharmaco-organs. In this embodiment, the PET emission image is static and the structures to be segmented are tumors.

The outline of the regions of interest assumes that each organ has a homogenous behavior for a given tracer.

"Pharmaco-organ" thus in a known manner refers in this description to a structure of the organism whereof all of the elements have an identical response to a tracer. Consequently, a "pharmaco-organ" is a structure within which the concentration of the tracer is homogenous.

In reference to FIGS. 2 and 3, the segmentation method 200 comprises three successive phases: a phase for preparing the image or sequence of images, a phase for dividing the image into regions of interest, and lastly a linkage phase.

During the phase for preparing the image or sequence of images, a step for extraction from a background 202 is done.

In fact, the image or sequence of images 109 acquired by the image acquisition device 102 has two zones, one associated with the subject 104 and the other showing a background. Outside the body, the PET image only contains noise, reconstruction artifacts and zones not of diagnostic interest (the bed, the patient's gown, etc.). This background can therefore be eliminated from the segmentation without damage, which accelerates it and decreases the risk of error.

In a known manner, the image or sequence of images is first smoothed before being segmented by a Gaussian function whereof the full width at half maximum maximizes the contrast ratio on the noise at the tumors.

To extract the background, a transmission image is acquired before or after the emission image on a PET system, so as to correct the emission image from the attenuation of photons by the patient's body. A threshold value is defined on this transmission image at an intermediate attenuation value between the air and the soft tissue and makes it possible to remove a mask from the body's tissues, only keeping the voxels whereof the value is greater than said threshold value. During this removal of the mask from the body's tissues, all or part of the lungs and the lumen of the intestine can be excluded from the mask. These regions being located inside the body, they are bordered with tissues and not connected to the outside of the body. The mask of the background 202-A to be excluded from the segmentation is therefore calculated as the largest connected component (within the meaning of the mathematical morphology) of the opposite of the mask of the body's tissues.

The segmenting method 200 also comprises a step 206 for calculating a local spatial variance map 204-A of said variable, for example the PET signal (activity or concentration of the tracer), incorporating the temporal variation of the signal. Such a variance is calculated for each voxel of the image or sequence of images 104.

The variance of the noise in the PET image is assumed to be equal to $\sigma_{n,t}^2 = \alpha^2 \times S_{n,t} \times DC_t/\Delta_t$ if the image has been reconstructed with an iterative reconstruction algorithm (SI for "Statistical Iterative"), and $\sigma_{n,t}^2 = \alpha^2 \times DC_t/\Delta_t$ if the image has been reconstructed by filtered back projection (FBP), where $\sigma_{n,t}^2$ and $S_{n,t}$ and $S_{n,t}$ are respectively the variance of the noise and the signal without noise at voxel n and time t, and where $\Delta_t$ is the duration of the time frame t and $DC_t$ is the factor accounting for the increase in the noise due to the radioactive decrease. Factor $\alpha^2$ is assumed to be stationary in space and time. It is therefore assumed to be equal to $\alpha^2 = \Delta_t \times \sigma_{n,t}^2 / (S_{n,t} \times DC_t)$ (SI) and $\alpha^2 = \Delta_t \times \sigma_{n,t}^2 / DC_t$ (FBP), and is estimated in the regions of the image not affected by the partial volume effect by:

$$\Gamma_n = \frac{1}{T} \times \sum_{1 \leq t \leq T} \left( \frac{\Delta_t}{\#(V_n) - 1} \times \sum_{j \in V_n} \frac{(Y_{j,1} - \mu_{n,t})^2}{\mu_{n,1}} \right)_{(SI)} \text{ and}$$

$$\Gamma_n = \frac{1}{T} \times \sum_{1 \leq t \leq T} \left( \frac{\Delta_t}{\#(V_n) - 1} \times \sum_{j \in V_n} (Y_{j,1} - \mu_{n,t})^2 \right)_{(FBP)},$$

where $V_n$ is a cubic neighborhood of the voxel n, for example size 3×3×3 for tumor detection, $\mu_n$ is the activity or average pharmacokinetics over $V_n$ and an estimate of the signal $S_n$.

The value $\Gamma_n$ partially reflects the noise, and in part the partial volume and/or the physiological movements. $\Gamma_n$ is the minimum and is a good approximation of $\alpha^2$ when $V_n$ is not affected by the partial volume effect or by the physiological movements, and reaches local minima in the core of the organs.

$\Gamma_n$ takes into account the local variations of kinetics in the vicinity of the voxel n, corrected by the dependency of the noise on the signal $DC_t$ and at $\Delta_t$.

$\Gamma_n$ is calculated for each voxel n inside the mask of the body delineated in the extraction step from the background 202.

The local minima of the local spatial variance map of the PET signal are then extracted, during the performance of an automatic extraction step 206 of at least one core point of the image or the sequence of images 104. The core points are the pixels of the minima of the local spatial variance map of said variable. The set of these pixels 206-A is denoted $\Lambda = \{n | \forall j \in V_n, \Gamma_n < \Gamma_j\}$.

After extraction of the core points, an extraction step 208 is performed for a temporal evolution 208-A of said variable at each core point. An estimate of the overall parameters of the noise is also done.

The processor calculates the local pharmacokinetics and estimates global parameters of the noise (i.e. $\alpha^2$) in a vicinity of the core points (of the set $\Lambda$). The neighborhood used to calculate the activity concentration or the pharmacokinetics within a small region, e.g. a tumor, is of a reduced size to limit the partial volume effect. The parameter $\alpha^2$ is estimated using the smallest values of the set $\{\alpha_m | m \in \Lambda\}$.

The second phase of the segmentation method 200 comprises a step 210 for dividing the image or sequence of images 104 into a plurality of regions 210-A. The number of core points extracted during the automatic extraction step 206 of at least one core point defines the number of regions of the image or sequence of images partitioned at the end of the division step 210.

To that end and in a known manner, a so-called "fast marching" method is used to simultaneously extract the active contours of minimal energies that join each voxel m∈Λ to all of the voxels in its neighborhood. The voxel n is aggregated to the voxel m∈Λ that minimizes the active contour of the minimal energy that joins the two voxels m and n.

To avoid the superfluous calculation of as many maps as voxels belonging to the set Λ, the energy maps of original active contours of all of the elements Λ are calculated simultaneously and competitively on the same map, according to the principle that a voxel is associated with the voxel of Λ whereof the energy map reaches it first.

The PET image of the subject is then partitioned into as many regions as there are voxels in the set Λ, i.e. core points, each region being a connected component.

Lastly, the last segmentation method phase 200 includes a step 212 for hierarchical linkage of the regions resulting from the division step 210 so as to obtain the three-dimensional image or sequence of images partitioned into regions of interest 212-A.

With a view to detecting tumors, the tumors must be preserved during the linkage, i.e. not be linked. However, the apparent contrast of the small tumors in a PET image is much lower than their actual contrast, due to the Partial Volume effect. In fact, the smaller a tumor, the more it appears in a spherical form in the PET image.

This is why the hierarchical linkage step 212 comprises two successive linkage steps, one 214 using shape and size criteria of the regions to not link the small regions, and the other without 216, without shape and size criteria of the regions, of the regions into regions of interest, without shape or size distinction.

In a known manner, during the hierarchical linkage step 212, a linkage cost between two regions is calculated from the evolution over time of said variable in each core point and the estimation of the global parameters of the noise extracted during the extraction step 208.

Then, according to a hierarchical linkage algorithm, the regions are linked according to a minimum linkage cost rule creating a new region or aggregate of regions. The linkage costs of the regions two by two are updated (recalculated) at each linkage step and until a number of regions predetermined by the operator exists. In addition, the linkage cost for a pair of regions or aggregates of regions that are not connected is still infinite.

The linkage cost, between a region $R_1$ and a region $R_2$, is defined:

for the linkage step 216 without shape and size criteria of the regions, by $\text{Cost}(R_1, R_2) = H(R_1, R_2)$, where H is a function dependent on the variations of the signal in regions $R_1$ and $R_2$, and for the linkage step 214 with shape and size criteria of the regions, by $$\text{Cost}(R_1, R_2) = \frac{H(R_1, R_2)}{F(R_1)F(R_2)G(R_1)G(R_2)}$$

where F and G are functions depending respectively on the shape and size of the region.

The linkage cost between the two regions therefore comprises:
- a term taking into account the difference in activity and/or possibly time course between the two regions, the function H,
- a term related to the shape of each of the two regions, the function F, and
- a term related to the size of each of the regions, penalizing the linkage of small regions, the function G.

In a known manner, $$H(A, B) = \frac{1}{T} \sum_{1 \le t \le T} (\mu_{m_A, t} - \mu_{m_B, t})^2,$$

where $m_A$ and $m_B$ are the core points of regions A and B whereof the local spatial variance of the variable is minimal, i.e.

$$m_A = \underset{m \in A}{\text{argmin}}(\Gamma_m) \text{ and } m_B = \underset{m \in B}{\text{argmin}}(\Gamma_m).$$

The size criterion for a region is its volume.

The shape criteria for a region is the surface to volume ratio: $S\sqrt{S}/V$. This criterion is independent of the size for a sphere or a cube. It is higher when the region is non-spherical and irrespective of the size of the region. However, it varies little (from 1 to 10) compared to the volume (variation from 1 to 100,000), which is why this ratio is at a significant power, for example 4, to generate a deviation between the spherical structures and the structures with more tortured shapes.

In this first alternative, in order to prevent this preservation of the small tumors from harming the linkage of several regions corresponding to the same tumoral focal point, the linkage is conducted in two steps carried out successively by the processor:

a) a linkage of the regions does not correspond to tumors, keeping a high number of regions R, i.e. according to the linkage step 214 with shape and size criteria for the regions, and b) a linkage from the segmentation image with R regions resulting from step a) making it possible to link regions corresponding to the same tumor, according to a linkage step 216 without shape and size criteria of the regions.

According to another embodiment, the hierarchical linkage step 212 is a double linkage comprising a linkage step 218 without shape and size criteria of the regions from the image or sequence or sequence of images divided into regions resulting from the performance of the division step 210 and parallel to the linkage step 214 using shape and size criteria of the regions from the same image or sequence of images followed by the linkage step 216 without shape and sizes criteria of the regions from the image or sequence of images resulting from the performance of the linkage step 214 with shape and size criteria of the regions preceding it.

This second alternative makes it possible to prevent this preservation of the small tumors from stopping the formation of regions corresponding to the organs, due to the introduction of the shape criterion adapted to the tumors, the processor performs a double linkage, i.e. one for the organs and one for the tumors.

Two different linkage steps are then conducted in parallel from the image partitioned into regions of interest following the performance by the processor of the step 210 for dividing the image:

for segmentation of the organs, the linkage step 218 without shape and size criteria of the regions will be carried out by the processor, and for segmentation of the tumors, the processor will perform the linkage in two steps 214 then 216 described in the first alternative.

For the detection of tumors, it is important to keep not only all of the regions before the linkage, but also the regions generated at the end of a linkage step 214 and/or 216.

If the segmentation is done after linkage without shape and size criteria 216, 2M−1 regions are kept at the end of the hierarchical linkage step 212, where M is the number of points extracted during the performance of the extraction step 206 for extracting core points.

However, the first linked regions have little chance of being tumors. To limit the detection to the regions whereof the likelihood of being a tumor is the strongest, it is possible to start from an intermediate segmentation image resulting from a first linkage step.

Thus, if the segmentation is done with a linkage step 214 using shape and size criteria for the regions, 2R−1 are kept at the end of the hierarchical linkage step 212, where R is the number of regions resulting from the first linkage step 214 with shape and size criteria of the regions.

Figure 4:
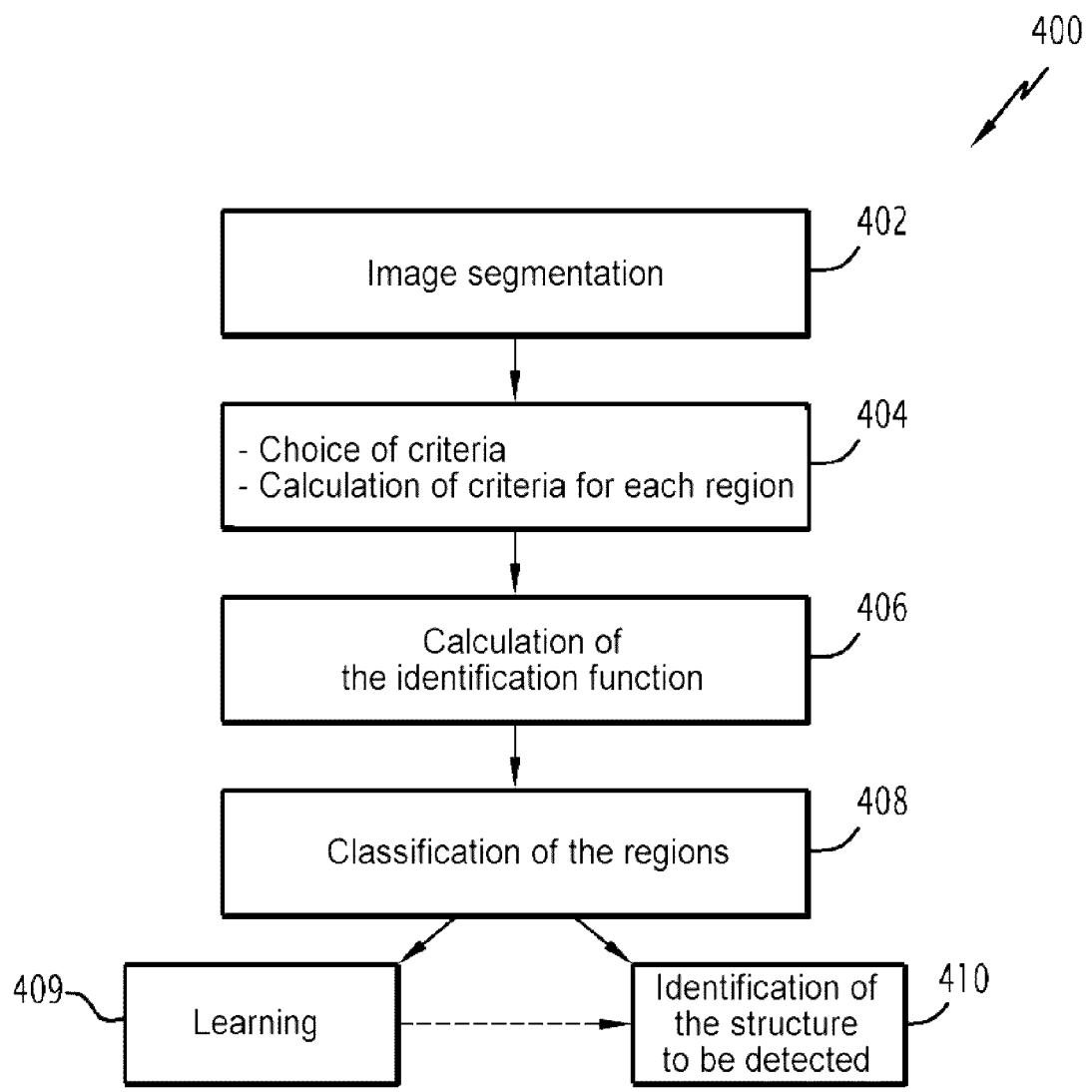
FIG. 4 is a block diagram illustrating the method for detecting at least one particular structure in an image or sequence of images according to the invention.

FIG. 4 is a block diagram illustrating the method 400 for detecting at least one particular structure on an image or sequence of images according to the invention. For example, the method for detecting specific structures is carried out by the processor so as to detect tumors.

This detection method 400 first comprises a step 402 for segmenting the image or sequence of images intended to partition it into a plurality of regions of interest. The performance of the segmentation step provides a hierarchical description of the regions delimiting the structures. Either the operator extracts a segmentation image therefrom comprising a number N of regions (N being large enough), or he uses 2M−1 or 2R−1 regions generated by the hierarchical linkage step 212. Preferably, the operator uses the 2R−1 regions generated by the linkage step 216 without shape or size criteria of the regions made after the linkage step 214 with the shape and size criteria of the regions.

The detection method 400 for detecting a particular structure also has a step for calculating a plurality of criteria 404 to discriminate between the particular structures to be detected for each region of interest. During its performance, the processor calculates the criteria selected for tumor detection. These criteria are the following, for each region i criteria related to the activity:

the contrast is calculated as $(\mu_n - \upsilon_n)/\upsilon_n$ where $\mu_n$ is the average of the activity within the neighborhood $V_n$ of the voxel n and where $\upsilon_n$ is the median of the activity on the periphery of the tumor at a distance from the edges thereof situated between 2 and 4 times the full width at half maximum of the resolution of the PET image.

$$C_1(i) = \frac{\mu_i - \upsilon_i}{\upsilon_i}$$

the contrast on noise is calculated as $(\mu_n - \upsilon_n)/(\upsilon_n \times \sigma_n)$, where $\sigma_{n,t}^2 = \alpha^2 \times DC_t/\Delta_t$ for each voxel n, for a PET image reconstructed by an analytical algorithm and $\sigma_n^2 = \alpha^2 \times \upsilon_n \times DC_t/\Delta_t$ for an image reconstructed by an iterative statistical algorithm. The constant factor $\alpha^2$ being calculated in the PET image during step 4 of the segmentation.

$$C_2(i) = \frac{\mu_i - \upsilon_i}{\upsilon_i \times \sigma_i}$$

a criterion for distinction between tumors and noise points. In order to distinguish between tumors and noise points, the PET image without post-smoothing undergoes a convolution by a Gaussian whereof the full width at half maximum is made to vary between 0 and three times the full width at half maximum, which maximizes the contrast to noise ratio. For each level of smoothing, the local minima of the image $\Gamma_n$ are extracted. For each minimum extracted in the smoothing that maximizes the contrast to noise ratio, the full width at half maximum (FWHM) for which this minimum appears in the other images is extracted. The greater this interval, the more the extracted minimum corresponding to the region at a low probability corresponds to a noise peak. The expanse of this interval $FWHM_{Max}(i) - FWHM_{Min}(i)$ is therefore used as selection criterion.

$$C_3(i) = FWHM_{Max}(i) - FWHM_{Min}(i)$$

size and shape criteria, as previously defined and used during performance of the segmentation method according to the invention:

the surface to volume ratio. In fact, the tumors are regions of greater activity, therefore with a higher signal to noise ratio than in a homogenous zone. Consequently, the contours of the tumors are smoother than those of the regions associated with the noise peaks. The small tumors appearing as spheres in the PET images have a high sphericity criterion. This sphericity criterion is lower for larger tumors with a less spherical shape, but this loss of sphericity is offset by a contrast and a high contrast to noise ratio. The sphericity criterion is as follows:

$$C_4(i) = \frac{V_i}{S_i \sqrt{S_i}}.$$

the volume. In fact, the smallest tumors are greatly affected by the partial volume effect, which decreases their apparent contrast with the surrounding tissues. The main purpose of this detection criterion: $C5(i)=1/V_i$ is to offset the loss of contrast of a tumor due to a smaller size.

$$C_4(i) = \frac{V_i}{S_i \sqrt{S_i}}.$$

A criterion of number of points extracted in the tumor during the extraction step 206 for extracting core points of the segmentation method 200, so as to separate the tumors from large organs (heart, liver, kidneys).

For tumors, this number of extracted points is smaller (rarely more than three) than in the organs (often more than three). $N_i$ being the number of core points extracted in the tumor during the extraction step 206 of the core points of the segmentation method 200, $$C_6(i) = \frac{1}{N_i}$$

An appearance criterion for the kinetics. The tumors and the inflammatory zones on a dynamic PET image are differentiated according to the pharmacokinetics measured in the regions. They are therefore separated by this kinetics appearance criterion:
   if the kinetics only contains two time points, the slope increases in the tumoral regions. The corresponding criterion is then:

$$C_7(i) = \frac{\mu_{i,1} - \mu_{i,0}}{\mu_{i,1} + \mu_{i,0}}$$

if the kinetics contains many time points, the kinetics extracted in a region is compared to a set of kinetics $\mu_i^{(k)}$ specific to the suspected type of cancer, and:

$$C_7(i) = \min_k \left( \left\| \frac{\mu_i}{\|\mu_i\|} - \frac{\mu_i^{(k)}}{\|\mu_i^{(k)}\|} \right\| \right)$$

The computer device thus calculates, for each region i, a series $\{C_j(i)\}_{1 \leq j \leq J}$ of criteria, supposed to assume high values for the regions corresponding to structures to be detected and lower values for the other regions.

A step 406 is then carried out for calculating an identification function depending on the plurality of criteria for each region of interest. The processor calculates the identification function $$f_\Theta(\{C_j(i)\}_{1 \leq j \leq J}) = \sum_{j=1}^{J} \theta_j \times C_j(i)$$

which depends on the plurality of criteria for each region of interest. The identification function is a function parametrically depending on a set of parameters $\Theta = \{\theta_j\}_{1 \leq j \leq J}$, the parameters $\theta_j$ being the weights allocated to each criterion $C_j(i)$. The parameters $\Theta = \{\theta_j\}_{1 \leq j \leq J}$ can be constant on the image, but also constant by pieces (for example, constant within each organ) or can vary continuously over space (for example, according to a probabilistic atlas describing the organs).

Then the regions are sorted during a step for classification of the regions 408 by decreasing values of their identification function $f_\Theta(\{C_j(i)\}_{1 \leq j \leq J})$, then a corresponding rank is allocated to them. The structure to be detected is identified during the performance of the identification step 410. Thus the region of rank 1 will be the one most likely to be a structure to be detected, for example a tumor.

According to another alternative, the identification method 400 is carried out to identify several different types of structures. To that end, different identification functions f(1), f(2), . . . , f(L) are defined. It may happen that two or more of these functions are the same, but with different parameter set values $\Theta$. These identification functions will probably have some shared identification criteria.

The detection requires learning on a set B of images b representative of the images in which one hopes to detect the structures (e.g. tumors). These images must therefore contain at least one of these structures, and preferably several. In the images in the learning base B, the structures to be detected are marked in one way or another as being the structures one is looking for. In another alternative, one also marks other structures as not being structures one is looking for or, failing that, considers that all of the unmarked regions are not structures to be detected.

Considering all of the images of the learning base B, a learning step 409 is performed and will not be described here. The learning step 409 makes it possible, over a certain set of images, to determine the set of parameters $\Theta$ that optimizes the detection of the structures.

The learning step can be conducted on several different types of structures, for example metastasis, small tumor, large non-necrotic tumor, necrotic tumor, aggregate of tumors.

The step for detecting these various types of structures is done simultaneously: all of the identification criteria including the f(1), f(2), . . . , f(L) are functions are calculated for all of the regions. The identification ranks are then calculated for each of these functions and each of these sets of parameters estimated on the learning base.

According to another alternative, a competing detection is done between the various identification functions.

In the case where the imaging device 102 is an imaging device according to the positron emission tomography technique, the image or sequence of images of the object or subject 104 is an image or sequence of images of an entire body and the regions of interest resulting from the segmentation method according to the invention are pharmaco-organs, i.e. the regions of interest correspond to functional organs. Said variable represents the radioactive concentration at a given moment of at least one active ingredient marked and injected into the body, the set of voxels inside each pharmaco-organ having pharmacological kinetics for distribution of said active ingredient that are similar.

In fact, the variations of the tracer concentration inside a voxel are highly spatially correlated due to the existence of a homogeneity continuum resulting not only from the PET image reconstruction method, but also from the existence of physiological regions that respond to the tracer identically, regions called pharmaco-organs.

The kinetics are thus assumed to be homogenous within each pharmaco-organ. This homogeneity, measured as the opposite of the local variance, is maximal at the core of the pharmaco-organs and minimal on the edges of said pharmaco-organs. The main non-homogeneity factor of the PET signal in a pharmaco-organ is the so-called "Partial Volume" effect due to the limited resolution of the PET system.

The body can be animated by physiological movements either of the periodic type, such as breathing, the period of which is reduced in comparison to the acquisition duration of the image or each of the images of the sequence, or of the non-periodic type.

These methods for segmenting and detecting particular structures and the associated computer device are intended to help the nuclear physician, but in no case to replace him. The detection method only presents regions sorted from most to least likely to be tumoral. Here, this only involves the relative probability of the regions relative to each other and does not constitute a diagnosis, the final decision falling to the nuclear physician. The method can be useful, non-useful or lead to error, but it cannot commit diagnostic errors. It is all the more useful when the nuclear physician is a beginner or not very trained and in organs for which the sensitivity and specificity of the diagnosis are weak without this tool.

This point is crucial, because it causes the number of nuclear physicians per patient to decrease: it becomes essential to provide tools to help with diagnosis that accelerate and reinforce the confidence in the physician's diagnosis undergoing a major overload in terms of work and an increasingly short time to read the PET image. This lack of qualified personnel for oncology diagnosis will probably require recourse to diagnosis by less qualified medical personnel (nurses) or those not specialized in the area (radiologists). For these people to be effective, they must be trained. The method makes it possible to train the user en route by drawing his gaze towards the zones of the image that are most probably tumors.

The segmentation method is used to automatically delimit the contour of the tumors in the PET oncology images. Then the automatic method for assisting with the detection of tumors segmented by the segmentation method, based on a sorting of the regions according to their likelihood of being a tumor, makes it possible to improve the sensitivity and specificity of the diagnosis. Lastly, the computer device makes it possible to perform the detection, delineation of the tumors and extraction of diagnostic parameters (contrast, contrast to noise, functional volume) from the automatic method for assisting with detection.

These segmentation and detection methods for particular structures and the associated computer device make it possible to:

- first improve both the sensitivity, by decreasing the number of false negatives, and the specificity, by decreasing the number of false positives, of the diagnosis by the nuclear physician, in particular in the difficult case of small tumors with a contrast that is sometimes weak relative to the background,
- facilitate and accelerate the nuclear physician's work by navigation in the images, tumor detection, extraction of quantitative diagnostic parameters,
- lead a nuclear physician with little experience of lacking practice to progress, on reference data, but also on his own data, by guiding his gaze toward the zones most likely to be tumors, and
- help the radiotherapist by offering a tool for delimiting focal points and zones to be spared.

What is claimed is:

1. A method for segmenting a three-dimensional image or sequence of three-dimensional images of an object so as to obtain a three-dimensional image or sequence of images partitioned into regions of interest comprising, in order:

(a) dividing the image or sequence of images into a plurality of regions in a computer system;

(b) hierarchically linking the plurality of regions to obtain the image or sequence of images partitioned into regions of interest in the computer system, wherein step (b) comprises (b)(i) hierarchically linking the plurality of regions based on a first linkage cost between regions within said plurality of regions without linking small regions corresponding to regions of interest, said first linkage cost being calculated taking into account region shape and region size criteria for the plurality of regions;

wherein step (b)(i) comprises (b)(i)(1) calculating a first linkage cost, between a region $R_1$ and a region $R_2$, defined by:

$$\text{Cost}(R_1, R_2) = \frac{H(R_1, R_2)}{F(R_1)F(R_2)G(R_1)G(R_2)}$$

wherein H is a function of the variations of the signal in regions $R_1$ and $R_2$, and F and G being functions of the region shape and region size; and linking the plurality of images according to a minimum first linkage cost rule.

2. The segmenting method of claim 1, wherein step (b) further comprises after the step (b)(i), a step (b)(ii) of hierarchically linking based on a second linkage cost between regions within said regions of interest, said second linkage cost being calculated without taking into account region shape and region size criteria.

3. The segmenting method of claim 2, wherein step (b)(ii) comprises (b)(ii)(1) calculating said second linkage cost between a region of interest $R_1$ and a region of interest $R_2$, defined by:

$$\text{Cost}(R1, R2) = H(R1, R2)$$

wherein H is a function of variations of the signal in the regions of interest $R_1$ and $R_2$; (b)(ii)(2) linking regions of interest according to a minimum linkage cost rule.

4. The segmenting method of claim 1, wherein step (b) further comprises, parallel to step (b)(i), a step (b)(iii) of hierarchically linking based on a third linkage cost between regions within said plurality of regions obtained after step (a), said third linkage cost being calculated without taking into account region shape and region size criteria.

5. The segmenting method of claim 4, wherein step (b)(iii) comprises (b)(iii)(1) calculating a third linkage cost, between a region of interest R1 and a region of interest R2, defined by $$\text{Cost}(R_1, R_2) = H(R_1, R_2)$$

wherein H is a function of variations of the signal in the regions of interest $R_1$ and $R_2$;

(b)(ii)(2) linking regions of interest according to a minimum third linkage cost rule.

6. The segmenting method of claim 1, wherein the three-dimensional image or sequence of three-dimensional images comprises a plurality of voxels and measurements for each of the voxels of a variable of the three-dimensional image or sequence of three-dimensional images, during n time intervals (n≥1) and the segmentation method comprises, before step (a), performing the following to define a number of regions separated during step (a):

(1) calculating a local spatial variance map of a measure of said variable of the three-dimensional image or sequence of three-dimensional images, over time and for each voxel of the three-dimensional image or sequence of three-dimensional images;

(2) extracting at least one core point of the three-dimensional image or sequence of three-dimensional images, the core points being pixels of minima of the local spatial variance map of said variable, wherein the number of core points extracted during step (2) defines a number of regions of the three-dimensional image or sequence of three-dimensional images divided at the end of step (a).

7. The segmentation method of claim 6, further comprising, after step (2) but before step (a), extracting a temporal evolution of said variable of each core point and an estimation of the global parameters of the noise, configured to calculate the linkage cost during step (b).

8. The segmenting method of claim 6, wherein each region resulting from step (a) corresponds to a core point resulting from step (2) and each region groups together pixels having a similar temporal evaluation of said variable.

9. The segmenting method of claim 1, further comprising excluding a background of the three-dimensional image or sequence of three-dimensional images, wherein excluding comprises defining a threshold for the three-dimensional image or sequence of three-dimensional images configured to extract a mask of the object from an image acquired in transmission of the object so as to apply the segmentation method only to the object.

10. The segmenting method of claim 9, wherein excluding the background further comprises smoothing to maximize a contrast of the image in the small regions of interest before defining a threshold.

11. The segmenting method of claim 1, wherein said three-dimensional image or sequence of three-dimensional images is acquired beforehand by an imaging device according to the positron emission tomography technique.

12. The segmenting method of claim 1, wherein the three-dimensional image or sequence of three-dimensional images of an object is an image or sequence of images of an entire body, said segmentation method segmenting the body according to a partition based on pharmaco-organs.

13. The segmenting method according to claim 12, wherein the body is animated by physiological movements either of periodic type, the period of which is reduced in comparison with the acquisition duration of the image or each of the images of the sequence, or non-periodic type.

14. The segmenting method of claim 12, wherein said variable represents a radioactive concentration at a given moment of at least one active ingredient marked and injected into the body, and each pharmaco-organ having pharmacological kinetics for distribution of said active ingredient includes a set of voxels that are similar.

15. The segmenting method of claim 1, wherein the hierarchically linking step of (b)(i) comprises:
calculation of said first linkage cost between two regions based upon size and shape of said two regions; and
linking of regions into a region of interest according to a minimum first linkage cost rule.

16. The segmenting method of claim 1, wherein the step (b)(i) of hierarchically linking the plurality of regions based on the region shape and the region size criteria for the plurality of regions, wherein the decision of aggregating regions of the plurality of regions into a one of the regions of interest depends on shape and size of said regions, so as not to link small regions that thus become respective regions of interest.

17. A method for detecting at least one particular structure in an image or sequence of images, the method comprising:
(a) segmenting the image or sequence of images into a plurality of regions of interest according to claim 1;
(b) calculating a plurality of criteria to discriminate between particular structures to be detected for each region of interest;
(c) calculating an identification function based on the plurality of criteria for each region of interest, the identification function being a parametric function based on a set of parameters;
wherein the plurality of criteria comprise shape criterion for the regions of interest so as to discriminate between particular structures among the regions of interest.

18. The method for detecting a particular structure of claim 17, wherein segmenting the image or sequence of images into a plurality of regions of interest is performed according to claim 2.

19. The method for detecting a particular structure of claim 17, further comprising classifying regions of interest according to a probability of being a particular structure to be detected from the calculation of the identification function.

20. A computer device for segmenting a three-dimensional image or sequence of three-dimensional images of an object acquired by an imaging device comprising:
(a) a first device configured to divide the three-dimensional image or sequence of images into a plurality of regions;
(b) a second device configured to hierarchically link the plurality of regions to obtain the three-dimensional image or sequence of images partitioned into regions of interest;
wherein the second device comprises (b)(i), a first linkage device configured to hierarchically link the plurality of regions based on a first linkage cost between regions within said plurality of regions without linking small regions corresponding to regions of interest, said first linkage cost being calculated taking into account region shape and size criteria for the plurality of regions:
wherein step (b)(i) comprises (b)(i)(1) calculating a first linkage cost, between a region $R_1$ and a region $R_2$, defined by:

$$\text{Cost}(R_1, R_2) = \frac{H(R_1, R_2)}{F(R_1)F(R_2)G(R_1)G(R_2)}$$

wherein H is a function of the variations of the signal in regions $R_1$ and $R_2$, and F and G being functions of the region shape and region size; and
linking the plurality of images according to a minimum first linkage cost rule.

21. A computer device for detecting at least one particular structure on an image or sequence of images, the device comprising:
(a) a computer device, according to claim 20, for segmenting a three-dimensional image or sequence of images into a plurality of regions of interest;
(b) a detector comprising:
(1) a first calculator configured to calculate a plurality of criteria to discriminate between the particular structures to be detected for each region of interest; the plurality of criteria comprising a shape criteria for the plurality of regions of interest so as to discriminate the particular structures among the plurality of regions of interest;
(2) a second calculator configured to calculate an identification function based on the plurality of criteria for each region of interest, the identification function being a parametric function based on a set of parameters.

22. The computer detection device of claim 21 further comprising:
(c) a first device configured to automatically adapt a color palette for a region of interest of the image or sequence of images designated by an operator, the device being configured to help the operator establish a diagnosis; and
(d) an interface comprising a display configured to display information generated by the automatic adaptation device of the color palette.

23. The computer detection device of claim 22, wherein the interface comprises a display for displaying structures detected and classified by the detector.

24. The detection device of claim 21, further comprising a device configured to quantify diagnostic parameters in a structure designated by the operator, and a device configured to compare the diagnostic parameters between at least two images, wherein the interface comprises a display for displaying diagnostic parameters and a result of the comparison done by the comparison device.

25. The computer device of claim 20, wherein step (b)(i) further comprises a decision of aggregating regions of the plurality of regions into a region of interest depending on shape and size of said regions, so that the device does not link small regions based on region shape and region size criteria
- calculate a linkage cost between two regions based upon size and shape of said two regions; and
- link regions into a region of interest according to a minimum linkage cost rule.

26. The computer device of claim 20, wherein step (b)(i), further comprises a decision of aggregating regions of the plurality of regions into a region of interest depending on shape and size of said regions, so that the device does not link small regions, that thus become respective regions of interest, based on region shape and region size criteria.

\* \* \* \* \*